Figure 1:
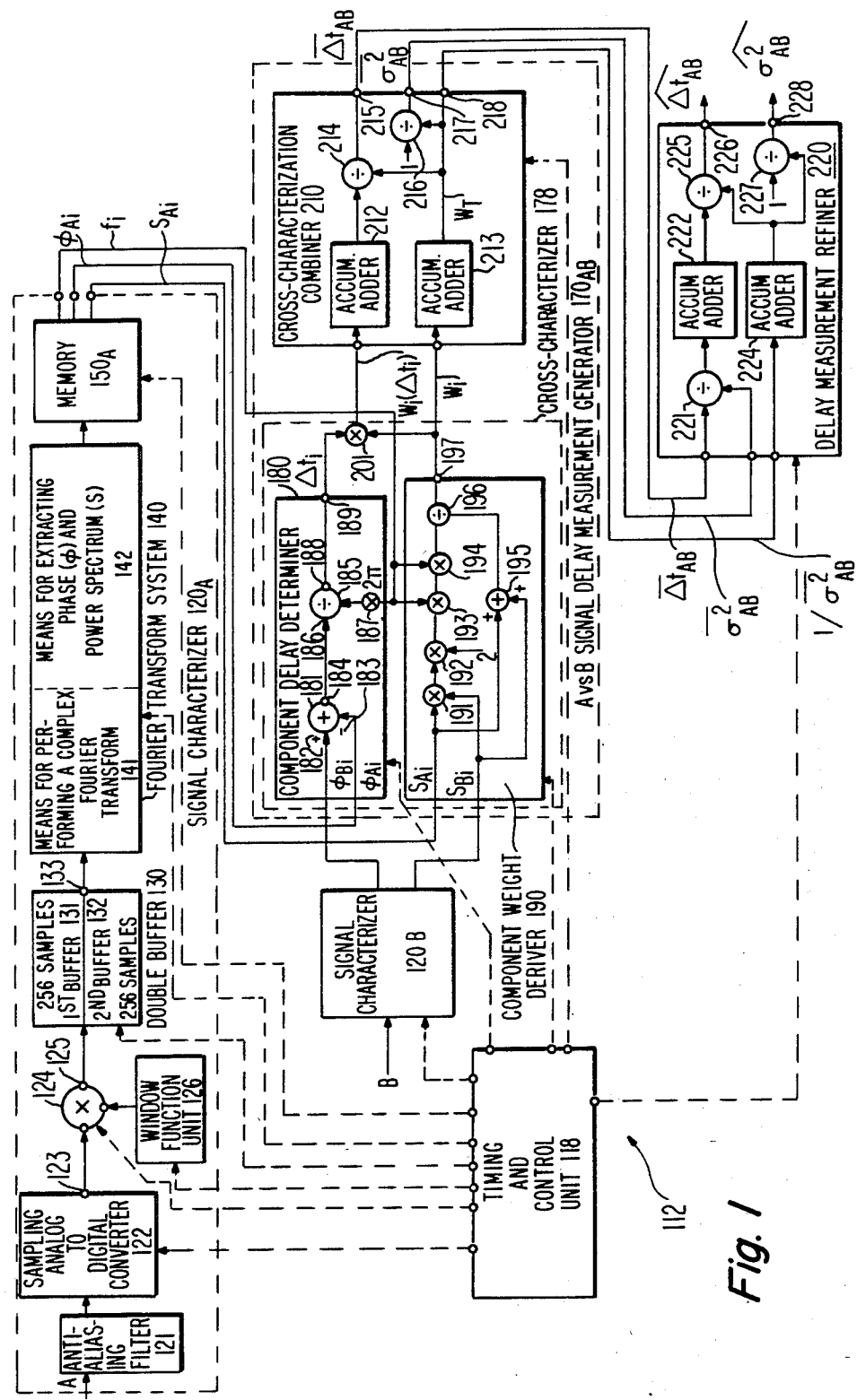

United States Patent [19]

Kaplan

[11] Patent Number: 4,604,717
[45] Date of Patent: Aug. 5, 1986

[54] METHOD AND APPARATUS FOR MEASURING THE TIME DELAY BETWEEN SIGNALS

[75] Inventor: Albert Kaplan, Cherry Hill, N.J.

[73] Assignee: RCA Corporation, Princeton, N.J.

[21] Appl. No.: 467,645

[22] Filed: Feb. 18, 1983

[51] Int. Cl.⁴ .............................................. G06F 15/20
[52] U.S. Cl. ................................ 364/569; 328/129.1; 328/133; 343/387; 343/465; 364/576
[58] Field of Search ............................. 328/129.1, 133; 343/5 FT, 17.1 R, 463, 387, 389, 465; 364/569, 576, 725, 726, 728

[56] References Cited

U.S. PATENT DOCUMENTS

| | | | |
|---|---|---|---|
| 2,768,348 | 10/1956 | Grumet et al. | 364/569 X |
| 3,137,854 | 6/1964 | Anderson | 364/569 X |
| 3,156,817 | 11/1964 | Briggs | 364/569 |
| 3,157,781 | 11/1964 | Gruen | 364/569 X |
| 3,665,469 | 5/1972 | Williams | 328/155 X |
| 3,710,331 | 1/1973 | Kiisk | 343/464 |
| 3,812,493 | 5/1974 | Afendykiw et al. | 343/12 R |
| 3,863,256 | 1/1975 | Smith | 343/451 |
| 3,878,381 | 4/1975 | Broder et al. | 364/728 |
| 3,881,096 | 4/1975 | Schmidt | 364/449 |
| 3,936,831 | 2/1976 | Jones | 343/16 M |
| 3,943,514 | 3/1976 | Afendykiw et al. | 343/16 R |
| 4,000,466 | 12/1976 | Scouten et al. | 328/133 X |
| 4,008,470 | 2/1977 | Lanning et al. | 343/6 A |
| 4,176,337 | 11/1979 | Aechter et al. | 364/569 X |
| 4,215,345 | 7/1980 | MacDoran | 343/465 |
| 4,242,732 | 12/1980 | Campbell | 364/726 X |
| 4,303,983 | 12/1981 | Chaborski | 364/569 |
| 4,433,335 | 2/1984 | Wind | 343/387 X |
| 4,471,357 | 9/1984 | Wu et al. | 343/5 FT |

OTHER PUBLICATIONS

"A Signal Processor for Communications Signal Analysis", by S. J. Nossen et al, NAECON proceedings, May 1980, pp. 233-236.

Primary Examiner—Errol A. Krass
Assistant Examiner—Edward R. Cosimano
Attorney, Agent, or Firm—Joseph S. Tripoli; Robert L. Troike; Robert Ochis

[57] ABSTRACT

A system for determining the delay between first and second signals includes apparatus for characterizing each signal and apparatus responsive to corresponding portions of the first and second characterizations for providing an estimate of the delay of the second signal relative to the first. In a preferred embodiment the characterizer dissects the signal into a plurality of separate components each having a different frequency. A cross-characterizer determines the time delay between corresponding components of the two characterizations and derives a weight for each determined delay. A cross-characterization combiner forms a weighted sum of the determined component delays which becomes the discriminated delay between the two signals.

21 Claims, 2 Drawing Figures

METHOD AND APPARATUS FOR MEASURING THE TIME DELAY BETWEEN SIGNALS

This invention relates generally to the field of signal processing and more particularly to techniques for discriminating the time delay between two similar signals.

Correlation techniques can be used to determine the time delay between two similar signals which have been corrupted by noise. However, whether the result of the cross-correlation is meaningful depends on the signal-to-noise ratios and other characteristics of the signals. As the power level of the signals decreases, noise at a constant level becomes a more significant portion of each of the signals. This increases the problems of delay determination by correlation techniques and can require substantial increases in correlation time. The time delay between voice information signals is difficult to determine by correlation. Such determinations become especially difficult when the signals are at low power levels in a noisy environment.

The location of a radiation source can be determined by measuring the difference in time of arrival of a signal from that radiation source at three different places. This determination requires measurement of the relative delay between the three received signals. In many situations those signals have low signal-to-noise ratios.

A delay discriminator is needed which can reliably determine that time delay between two signals which have been corrupted by noise. For certain applications it is desirable to have a delay discriminator which does not rely on special characteristics of the signals.

The system of the present invention solves these prior art problems through means for individually characterizing signals and means responsive to corresponding portions of those characterizations for providing a measure of the time delay of one signal relative to another. One embodiment which discriminates the delay of a second signal relative to a first signal includes means for dissecting a time segment of each signal into component frequencies as a means of characterizing that signal. A means for cross characterizing the first and second signals responds to the signals' components at each component frequency (corresponding components) and determines the time delay of each component of the second signal relative to the corresponding component of the first signal. This cross-characterization means also derives a weight for each of these time delay determinations. A means for combining these cross-characterizations is responsive to these time delay determinations and their associated weights and generates a measure of the delay of the second signal relative to the first.

This embodiment also provides an estimate of the uncertainty of that delay measurement. Means for refining the measurement may combine a number of separate delay measurements (each based on a different time segment of the signals) to provide a measurement having a smaller estimate of its uncertainty.

IN THE DRAWINGS

Figure 2:
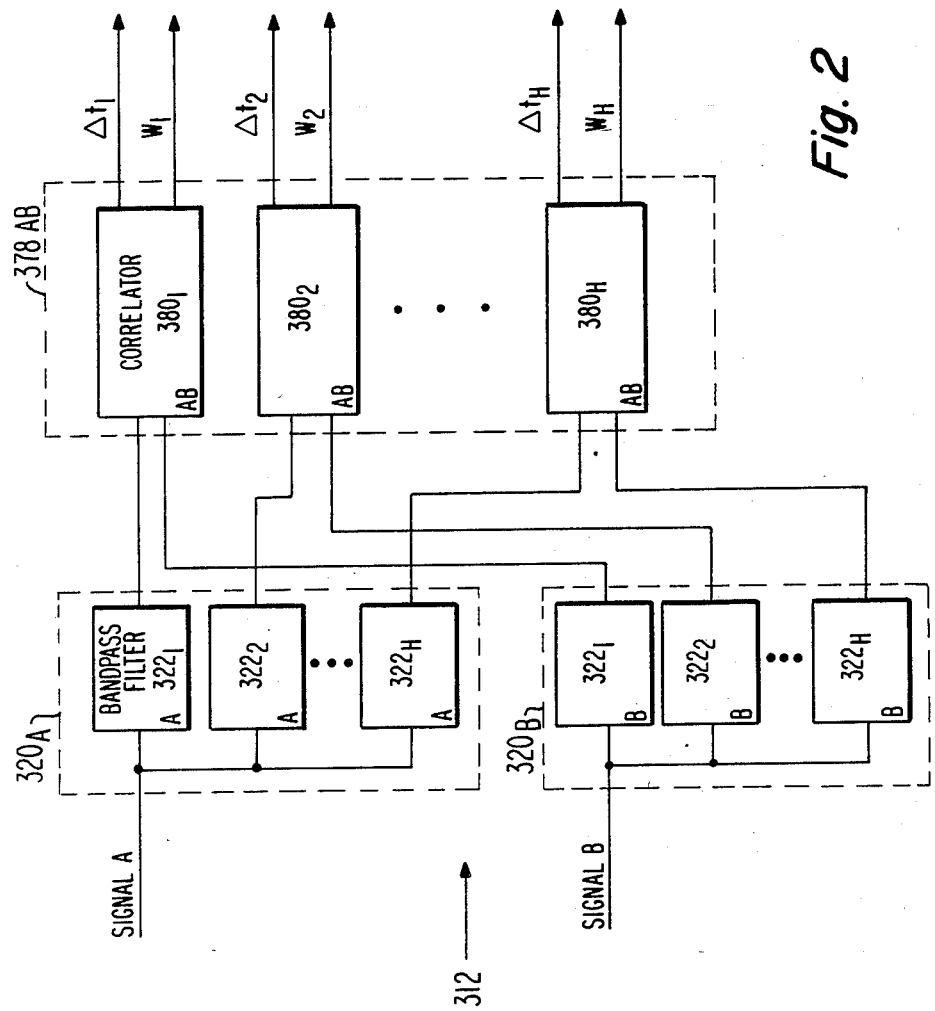

FIG. 1 is a schematic illustration of a delay determination system in accordance with the invention; and FIG. 2 is a schematic illustration of an alternative system for dissecting and cross-comparing the signals.

One preferred embodiment of a delay discriminator 112 for discriminating the delay between signals A and B in accordance with the present invention is illustrated in a block diagram form in FIG. 1. In this discriminator 112 each of the signals A and B is applied to an associated signal characterizer 120A or 120B, respectively. The signal characterizer 120A is shown in detail whereas the signal characterizer 120B is shown as a block.

Within signal characterizer 120A the signal A is passed through an anti-aliasing filter 121 which in this embodiment is a low pass filter having a sharp cut-off at 4 KHz. Anti-aliasing filter 121 prevents a subsequent sampling operation from translating high frequency signal components so that they appear to be low frequency ones. From anti-aliasing filter 121 the now frequency limited signal is coupled to a sampling analog-to-digital converter 122. This converter samples the amplitude of the signal A at certain times (i.e. at a sampling frequency) determined by timing and control system 118. For audio signals having a bandwidth of up to 3.2 KHz the sampling is preferably at an 8 KHz rate (twice the cut-off frequency of the anti-aliasing filter). Thus one sample is taken every ⅛ millisecond. This sampling rate is high enough to ensure that the samples comprise an accurate representation of the 3.2 KHz input signal. Each of the amplitude samples is analog-to-digital converted to provide a digital value representative of the amplitude of that sample. These digital values are provided in sequence at an output terminal 123 of the converter 122. The remainder of characterizer 120A processes these samples to produce a characterization of signal A which can be used for delay determination purposes.

For signal processing the samples of the signal are handled in groups of 2H samples. In this embodiment 2H is 256. Since the samples are taken every ⅛ millisecond each group of 256 samples represents 32 milliseconds of the input signal. Each group of 256 samples from converter 122, is multiplied in a multiplier 124 by a 256 point window function. In this operation each sample is multiplied by an associated window function value. The window function values are provided to multiplier 124 by a window function unit 126 which may be a recirculating register which is 256 stages long.

The window function is trapezoidal. That is, the initial window function value is small with successive ones increasing until a maximum value is reached after which it remains constant until it begins decreasing to return to the initial small value at the end of its series of 256 values. The window function is synchronized with the operation of the converter 122 and multiplier 124 by timing and control unit 118. In this embodiment the rise and fall of the trapezoid are each 32 steps long for a set of 256 samples. The first window function value is zero. The second is 1/32. The window function value increases in increments of 1/32 until a value of 1 is reached for the thirty-third sample. The window function value remains 1 until the two hundred and twenty-fourth sample where the value reduces to 31/32. The value reduces by 1/32 for each successive sample until the 256th sample where the value is zero. Thus, the first 32 and the last 32 samples in each set of 256 samples have their amplitudes reduced by the multiplication by the window function. This reduction in amplitude for early and late samples smooths the transition between the zero value each sample group has outside its span of 256 samples and the full value middle portion (192 samples) of the sample group. This smoothed transition provides a modifed 16 sample set which, when Fourier transformed, provides lower phase errors than the unmodified set of samples would provide when transformed. A Fourier transformation is subsequently performed on the sample set. Window function unit 126 and multiplier 124 can be omitted from characterizer 120 with a consequent decrease in characterization accuracy.

The output terminal 125 of multiplier 124 is coupled to the input terminal of a double buffer 130. Double buffer 130 temporarily stores each sample-window function product. Double buffer 130 includes first and second registers 131 and 132, respectively which operate independently.

Those values comprising one modified set of 256 samples are stored in the first buffer register 131 as they are received. When the full 256 samples of that modified set have been received, storage of incoming (modified) samples is switched to the second buffer register 132. This switching is synchronized with window function unit 126 by timing and control unit 118. While samples are being placed in storage in the second buffer register 132, the first buffer register 131 is read out through output terminal 133. When the second buffer register becomes full (256 samples) the input to the double buffer 130 is switched again to begin filling the first buffer while the second buffer is read out.

The 256 samples read out of buffer 131 are coupled to a Fourier transform system 140 which includes a means 141 for performing a 256 point complex Fourier transform and a means 142 for extracting a phase spectrum and a power spectrum from the output of the Fourier transform. Means 141 provides 128-point-complex-Fourier-transform data as its output. Because 256 equally-spaced-in-time samples are transformed, the 256 point Fourier transform's output data comprises 256 different frequencies. Half of these frequencies are positive and half are negative. These 256 values contain the information required to compute the power and phase of 128 frequency components of the signal. The number of frequency components is always half the number of samples transformed. Thus, if 2H samples are transformed there are H powers and phases. The power, phase and frequency values from means 141 are provided to the means 142 for extracting the phase ($\phi$) and the power spectrum (S) of this Fourier transform data. The phase ($\phi$) for a given positive frequency $|f_i|$ (of these 128 positive frequencies) is $$\phi = \arctan \frac{\text{amplitude of the } (-|f_i|) \text{ frequency}}{\text{amplitude of the } (+|f_i|) \text{ frequency}}.$$

This phase is calculated in radians. The power (S) for that given positive frequency $|f_i|$ is $$S = (\text{amp. of } (+|f_i|) \text{ freq.})^2 + (\text{amp. of } (-|f_i|) \text{ freq.})^2,$$

where "amp. of $(+|f_i|)$ freq." is the amplitude of the component having the freq. $+|f_i|$. Means 142 provides 128 phases (one for each frequency magnitude) and 128 power levels (one for each frequency magnitude) as its output. Each of these frequencies is treated as positive. This is the 128 point transform output from means 142. Each of these frequencies is referred to as a component of the input signal A.

Thus, the Fourier transform system 140 dissects the signal A into a set of 128 component frequencies whose phase and power characterize signal A during the corresponding 32 millisecond portion of signal A. The frequency component at DC (frequency=0) has no meaningful phase information and is discarded. This characterization of signal A is coupled to and stored in a memory 150 for use in determining the delay of signal B with respect to signal A. This stored characterization has three values associated with each component i, $1 \leq i \leq 127$—its frequency $f_i$, its phase $\phi_i$ and its power $S_i$. In a system in which the sampling rate is fixed, the $f_i$'s are fixed and therefore may be stored separately from the phases and powers which change from sample set to sample set.

Depending on the Fourier transformation procedure utilized, Fourier transform system 140 may comprise a single transformation means which provides its Fourier transform data in the form of 128 positive frequencies each having a phase and a power level. The Fourier transform system 140 (means 141 and 142) operates under the control of timing and control unit 118 and completes its processing of one set of modified data samples while the subsequent set of samples is being taken, modified and placed in storage in the double buffer 130.

At the same time that the signal characterizer 120A has been frequency dissecting a set of samples from signal A to provide a characterization of signal A, the signal characterizer 120B has been performing a similar dissection on a time related sample set from the signal B to provide a characterization of input signal B. Normally sampling analog-to-digital converters 122A and 122B operate simultaneously and the switching of the buffers in each of the characterizers occurs at the same time. Under these conditions the sample sets from signals A and B are in synchronism. If the Fourier transform system is fast enough, a single such system can perform the Fourier transformation for both signals A and B.

The Fourier transform data for signals A and B are provided from the memories 150 of the respective characterizers 120A and 120B to an A vs. B Signal Delay Measurement Generator 170AB. The generator 170AB includes two major units—a signal cross characterizer 178 and a cross characterization combiner 210. In this embodiment the cross characterizer 178 includes a component delay determiner 180 and a component weight deriver 190.

The phase and the associated frequency of each of the components of the signals A and B is provided to the component delay determiner 180. Determiner 180 determines the time delay of each component of signal B relative to the same component of signal A. These determinations may preferably be made in sequence one component at a time. The phases of the components of signals A and B, $\phi_{Ai}$ and $\phi_{Bi}$, respectively, for a given frequency $f_i$ are applied to the two input terminals 182 and 183, respectively, of a combiner 181 where the two signals are subtracted. These phases are in units of radians. Input terminal 182 has a positive sense and input terminal 183 has a negative sense. The difference ($\phi_{Bi} - \phi_{Ai}$) of these two phases is provided at the output terminal 184. This difference is taken modulo $2\pi$. That is if the difference D is less than $-\pi$, then $2\pi$ is added to it successively until the difference D is in the range $-\pi \leq D \leq \pi$ and if $D > \pi$, then $2\pi$ is subtracted successively until $-\pi \leq D \leq \pi$. If there is no time delay between a pair of corresponding components their phases are equal and this difference is zero. If component B is delayed with respect to component A, the phase of component B is greater than that of component A and the difference is positive. If component B is advanced with respect to component A, then the difference is negative. This difference is the phase difference of the two components at frequency $f_i$. To convert this phase difference (in units of radians) at a frequency $f_i$ to a time difference it is necessary to divide this phase difference by the $2\pi$ times the frequency ($2\pi f_i$). This is done in a divider 185.

The phase difference is coupled to the dividend input terminal 186 of divider 185. The frequency $f_i$ times $2\pi$ is applied by multiplier 187 to the divisor input terminal of divider 185. The quotient of these two factors is the delay $\Delta t_i$ of the component of signal B at frequency $f_i$ relative to the component of signal A at frequency $f_i$. This delay $\Delta t_i$ is in seconds and is positive when component B is delayed relative to component A. This time delay value is provided at the output terminal 188 of divider 185 and at the output terminal 189 of time delay determiner 180.

The time delays $\Delta t_i$ for all 127 components could be added together and divided by 127 to provide an average time delay $\Delta t_{AB}$ as the estimate of the delay of signal B relative to signal A:

$$\Delta t_{AB} = \sum_{i=1}^{127} \Delta t_i / 127.$$

However, this does not take full advantage of all of the information about signals A and B which is provided by the characterizers 120. A much more accurate time delay measurement which has a much smaller uncertainty may be provided if a weighted average of the time delays $\Delta t_i$ is taken in which each of the time delays $\Delta t_i$ is weighted in accordance with its relative reliability.

The higher power level components provide more reliable delay determinations than lower power-level components. Also, higher frequency components provide better estimates of the time delay than lower frequency components. The relative merit is a function of the frequency squared. For this reason each of the time delays $\Delta t_i$ is weighted by a factor $W_i/W_T$ in combining them to provide a signal delay measurement. The term $W_i$ is referred to as the weight for the time delay $\Delta t_i$. The denominator $W_T$ is the sum of the $W_i$'s. Thus, $$W_T = \sum_{i=1}^{127} W_i.$$

The estimate of the delay $\overline{\Delta t_{AB}}$ of the signal B relative to signal A is:

$$\overline{\Delta t_{AB}} = \sum_{i=1}^{127} (\Delta t_i)(W_i/W_T)$$

Since $W_T$ is a constant for a given pair of signal A and signal B characterizations this is the same as:

$$\overline{\Delta t_{AB}} = \frac{\sum_{i=1}^{127} (\Delta t_i)(W_i)}{W_T}$$

Thus in the general case where there are H dissection frequencies:

$$\overline{\Delta t_{AB}} = \frac{\sum_{i=1}^{H-1} (\Delta t_i)(W_i)}{\sum_{i=1}^{H-1} W_i}$$

This latter form is employed in this system because it allows each term $(\Delta t_i)(W_i)$ to be accumulated as it becomes available and because it replaces (H-1) divisions by (H-1) additions and one division. This speeds the signal processing and minimizes storage requirements.

The weights $W_i$ are provided by weight deriver 190 in response to the frequency $f_i$ and the powers $S_{Ai}$ and $S_{Bi}$ of the signals A and B at frequency $f_i$, respectively. These values are provided as first, second and third inputs to the component weight deriver 190. A series of four two-input multipliers 191-194 receives these power levels and this frequency and produces the product $2S_{Ai}S_{Bi}f_i^2$. The power levels $S_{Ai}$ and $S_{Bi}$ are also applied to the input terminals of a two-input adder 195. Both of these input terminals have a positive sense. The sum $S_{Ai}+S_{Bi}$ from adder 195 is applied to the divisor input of a divider 196. The product $2S_{Ai}S_{Bi}f_i^2$ from multiplier 194 is applied to the dividend input of divider 196. The quotient at the output terminal of divider 196 is $(2S_{Ai}S_{Bi}f_i^2)/(S_{Ai}+S_{Bi})$. This value is provided at the output terminals 197 of weight deriver 190 as the weight $W_i$. The factor $$\frac{2S_{Ai}S_{Bi}}{S_{Ai}+S_{Bi}}$$

is an estimate of the effective signal-to-noise ratio of the signal A and the signal B components at frequency $f_i$ (relative to the other frequency components) for time delay measurement purposes, assuming a uniform noise distribution over frequency. This factor must be multiplied by the frequency squared to provide a frequency adjusted weight ($W_i$) at each of the various frequencies $f_i$. This frequency adjusted weight is directly proportional to the merit of the time delay estimate at that frequency $f_i$ and is in a form which can be added directly to determine $W_T$ and which provides time-delay-weight products $(\Delta t_i)(W_i)$ which can be added directly.

The timing and control unit 118 regulates the operation of the memories 150, determiner 180 and deriver 190 to produce the time delay and weight values $\Delta t_i$ and $W_i$ for a given $f_i$ component simultaneously. These values for a given i are provided as inputs to a multiplier 201. The output from multiplier 201 (the product $(W_i)(\Delta t_i)$) is a weighted time delay determination for the $i^{th}$ frequency. The weighted time delay determinations $(W_i)(\Delta t_i)$ and the weights $W_i$ (for all i) comprise a cross-characterization of signals A and B and are provided as inputs to the cross-characterization combiner 210. Alternatively, multiplier 201 can be considered part of combiner 210 which then receives the inputs $\Delta t_i$ and $W_i$.

Within combiner 210 the product $(\Delta t_i)(W_i)$ is provided as an input to an accumulating adder 212 and the weight value $W_i$ is provided as an input to an accumulating adder 213. Once the data for each of the component frequencies has been processed, the accumulating adders 212 and 213 provide as outputs the sums $$\sum_{i=1}^{127} (W_i)(\Delta t_i) \text{ and } \sum_{i=1}^{127} W_i,$$

respectively. The sum of the $(W_i)(\Delta t_i)$'s is the sum of the weighted time delays and is applied to the dividend terminal of a divider 214. The sum $W_T$ of the $W_i$'s is applied to the divisor terminal of the divider 214. The quotient from the divider 214 is the measure $\overline{\Delta t}_{AB}$ of the delay of the signal B with respect to the signal A. This signal is provided at the output terminal 215 of combiner 210. If the signal B is retarded relative to signal A, then the delay of the signal B is positive (greater than zero). If signal B is advanced relative to signal A, then the delay is negative (less than zero).

The value $W_T$ from adder 213 is also applied to the divisor input of a divider 216 which has a dividend input of one. The quotient from divider 216 is provided at an output terminal 217 of the combiner 210. The value at the terminal 217 is the uncertainty $\sigma^2_{AB}$ of the time delay estimate $\overline{\Delta t}_{AB}$. This uncertainty is a result of distortion of the signals and their components in a random way by the noise. The value $W_T$ from adder 213 is also provided at an output terminal 218. This value is equal to $1/\sigma^2_{AB}$.

So long as the delay between the signals A and B is less than one half the period of the highest frequency in the Fourier data, there is no ambiguity as to the phase of any component since all phases $(\phi)$ will be in the range $-180° < \phi < 180°$. If the time delay exceeds the above limit, then ambiguities in the phase of the high frequency components can be resolved by reference to the lower frequency components for which no phase ambiguity exists.

When the uncertainty $\sigma^2_{AB}$ is greater than desired and the delay between the signals is expected to remain substantially constant over the period of time in which a number of delay measuelay between the signals is expected to remain substantially constant over the period of time in which a number of delay measurements $\Delta t_{AB}$ are generated, a signal delay measurement refiner 220 may be provided to reduce the uncertainty. Refiner 220 receives a succession of delay measurements $\overline{\Delta t}_{ABj}$, $1 \leq j \leq J$ where J is the number of such measurements. Each measurement $\overline{\Delta t}_{ABj}$ has an associated uncertainty $\sigma^2_{ABj}$. These measurements are based on samples of the signals A and B which were taken from a succession of 32 millisecond portions of signals A and B. Therefore, in general the delay measurements and their uncertainties will vary. Within refiner 220, as each of the $\overline{\Delta t}_{ABj}$ and $\sigma^2_{ABj}$ values is received, the $\overline{\Delta t}_{ABj}$ value is divided by the $\sigma^2_{ABj}$ value in a divider 221. The quotient of this division is provided as an input to an accumulating adder 222. The value $1/\sigma^2_{ABj}$ from output terminal 218 of generator $170_{AB}$ is provided as an input to an accumulating adder 224. The output of accumulating adder 222 is divided by the output of accumulating adder 224 in a divider 225 whose quotient is provided at an output terminal 226 of refiner 220. This output signal is a refined measurement $\hat{\Delta t}_{AB}$ of the delay between the signals A and B, where the ^ indicates that this is a more refined estimate of the actual value of $\Delta t_{AB}$. The output of the accumulating adder 224 is divided into one in a divider 227. The quotient of this division is provided at an output terminal 228 of the refiner 220. The signal at the output terminal 228 is a value $\hat{\sigma}^2_{AB}$. If the actual delay between signals A and B is fixed, then the uncertainty $\hat{\sigma}^2_{AB}$ decreases with each successive sample $\overline{\Delta t}_{ABj}$ which is provided to the refiner 220. When a desired uncertainty level $\hat{\sigma}^2_{AB}$ has been obtained or a desired number J of delay estimates $\overline{\Delta t}_{ABj}$ have been combined, refiner 220 may be reset to begin calculating new values of $\Delta t_{AB}$ and $\hat{\sigma}^2_{AB}$.

It is preferred to use a signal processing digital computer to perform the operations of delay discriminator 112 because the computer's high speed enables the delay measurements to be provided in substantially real time. Such near real time delay measurements are necessary in many position location systems.

A wide variety of Fourier transform programs for digital computers are available which can perform the Fourier transform function. Any computer which can implement such programs can be used in the practice of the present invention. However, if the delay data is needed in "real time" a computer must be selected which is fast enough to perform the calculations in "real time". A signal processor which is fast enough to provide such real time data is described in a paper entitled, "A signal Processor For Communications Signal Analysis" by S. J. Nossen et al., which was published in the NAECON proceedings for May 1980 at pages 233-236. This signal processor is representative of one processor implementation which is easily adapted to implement the discrimination technique of this invention. This processor has been built and operated in a number of different systems.

As has been described, the delay discrimination process of this invention gives greater weight to the higher power and the higher frequency components of the signal—those portions of the signal which provide the more reliable delay determinations. In contrast, the prior art cross correlation method gives equal weight to all portions of the signals and thus lacks the gain which this invention provides by emphasizing the more meritorious portions of the signals. The differences between these techniques are particularly significant when the signal-to-noise ratio is small. Because of the improvement in the signal-to-noise ratio provided by the Fourier transform, the inventive technique can determine delays even when the signal-to-noise ratio is so low that delay determinations can not be made in reasonable times or in some cases not at all using cross-correlation techniques. The ability of the present invention to discriminate small delays is limited mainly by the resolution of any given implementation of the system, i.e. how noisy the signals are and how much time is available for making the determination.

This system is useful with any signal waveform. In a limiting case where the transmitted signal is an unmodulated pure sine wave, the method of this invention becomes equivalent to a cross-correlation delay determination. In the more general case where modulation is present on the signal, the inventive technique provides a more accurate delay estimate than cross-correlation does.

Computer simulations of the system of FIG. 1 were run. With voice communication input signals the performance of that system was consistently better by a wide margin compared to a known cross-correlation based system. One of the reasons for this superior performance is the dissection of the signal followed by production of individual weighted time delay determinations $(\Delta t_i)(W_i)$ which are combined and divided by $W_T$ to generate the measure of the delay of signal B relative to signal A. This weighting technique ensures that the signal delay measurement is more certain than any individual delay determination.

The system 112 of FIG. 1 generates the signal time delay measurement $\overline{\Delta t}_{AB}$ by a process comprising the steps of (1) characterizing each signal by dissecting it into separate frequency components, (2) determining the delay $\Delta t_i$ between the same frequency (corresponding) components of two signals, (3) deriving a weight $W_i$ for each delay determination ($\Delta t_i$) from the power in those components and (4) combining the determined time delays and weights to form the weighted sum $\overline{\Delta t}_{AB}$. By providing $\overline{\sigma^2}_{AB}$ as an additional output, the system is able to provide a refined measurement of the delay. This is done by forming a weighted sum of a time sequence of delay measurements $\overline{\Delta t}_{AB}$, where the $\overline{\sigma^2}_{AB}$'s are the weights.

In system 112 of FIG. 1 the dissection is done by Fourier transformation of a set of samples of the signal. The component delay is obtained by subtracting the phases and dividing by the frequency of the same frequency components of the two signals.

FIG. 2 illustrates an alternative structure 312 for a portion of the delay discrimination system. In this embodiment, each signal characterizer is in the form of a frequency dissector 320A (or 320B) which comprises a plurality of bandpass filters $322_i$, each centered at a different frequency. Rather than being a single frequency as in the Fourier transform embodiment of FIG. 1, each of these dissection frequencies includes a range of frequencies. Each filter defines one of these dissection frequency ranges which may be referred to as a primary frequency range. The single frequencies of the Fourier embodiment may also be referred to as primary frequency ranges since they are spaced apart in frequency. Each of these frequency ranges may be identified by and referred to by the center frequency $f_i$ of the bandpass filter i which dissects it from the signal. If each filter has a pass band shape which is the Fourier transform of the trapezoidal window function (of unit 126 in FIG. 1) and is centered at a different one of the $f_i$'s, then this dissection is equivalent to the sample and Fourier transform implementation 120 of FIG. 1. In this embodiment a cross characterizer 378 comprises a plurality of correlators $380_i$, one for each of the component frequencies. Each correlator is coupled to receive and correlate the signal A component and the signal B component in a given frequency range $f_i$. The output of the correlators are time delay determinations based on the portion of each input signal which is within the pass band of the corresponding A and B filters. A weight for this time delay determination is proportional to the power in those components. The time delays and the weights are coupled to a cross-characterization combiner which may be like combiner 210 of system 112 of FIG. 1.

This delay discriminator is particularly useful in a data transmission system in which data is encoded as a controllable delay between two signals. Such a system may transmit the two signals as the upper and lower sidebands of a suppressed carrier signal. A delay discriminator in accordance with this invention can recover encoded data from signals having a data rate which makes their signal-to-noise ratios too low to allow delay determinations to be accurately made using correlation techniques. As a result, the signals may be transmitted at lower power levels than would be required if a prior art correlation delay determiner were used. These lower power levels render the signals more difficult to intercept.

What is claimed is:

1. A signal processing system for measuring the time delay between first and second signals, said system comprising:
    means for receiving said first and second signals; and
    means for comparing said first signal to said second signal to determine the time delay of said second signal relative to said first signal comprising:
        means responsive to said first and second signals for dissecting them individually into respective first and second sets of components, each component having a power level, and a primary frequency range, each component in said first set having a different primary frequency range and having a corresponding component in said second set having the same primary frequency range;
        means responsive to said corresponding components of said first and second sets for generating a weighted time delay of each component in said second set relative to its corresponding component in said first set; and
        means for combining said weighted time delays to provide a measure of the time delay of said second signal relative to said first signal.

2. The system recited in claim 1 wherein:
    said means for receiving comprises first means for receiving said first signal and second means for receiving said second signal at a different location than said first means; and
    said system further comprises means responsive to said measure of the time delay for determining the location of a common source of said first and second signals.

3. The signal processing system recited in claim 1 wherein:
    said means for dissecting comprises:
        means for taking a series of amplitude samples of each of said first and second signals and for converting each of said samples to a corresponding digital value;
        means responsive to said digital values for Fourier transforming (1) a first set of said digital values derived from said first signal and (2) a second time related set of said digital values derived from said second signal to provide, respectively, first and second sets of Fourier transform data which include power and phase data at corresponding frequencies of said first and second sets; and
    said means for generating is responsive to the frequency, phases and powers of corresponding components of said first and second sets of Fourier transform data.

4. The signal processing system recited in claim 3 wherein:
    said means for generating, in determining the time delay for a given pair of corresponding components, is responsive to their phases and their frequency; and
    said means for generating, in deriving the weight associated with the time delay determination for the given pair, is responsive to the powers and the frequency of said corresponding components.

5. The signal processing system recited in claim 3 wherein said means for dissecting further includes means for processing with a window function, which reduces the magnitude of early and late samples of a set, (1) a set of said digital values from said first signal to provide said first set of digital values transformed by said means for transforming and (2) a time related set of said digital values from said second signal to provide said second set of digital values transformed by said means for transforming.

6. The signal processing system recited in claim 1 wherein said means for generating comprises:
   means for determining the time delay between said corresponding components and deriving a weight associated with each of said determined time delays; and
   said means for combining is responsive to said determined time delays and their associated weights for producing said measure of the time delay of said second signal relative to said first signal.

7. The signal processing system recited in claim 6 wherein said means for determining and deriving is responsive to the frequency, phases and powers of said corresponding components for providing a determined time delay which is a function of said frequency and phases and an associated weight which is a function of said frequency and said powers.

8. The signal processing system recited in claim 7 wherein said means for determining and deriving comprises:
   means for providing said determined time delay for the components at a given freuqency with a value equal to the phase of said second component minus the phase of said first component divided by their frequency.

9. The signal processing system recited in claim 8 wherein said means for determining and deriving further comprises:
   means for providing said associated weight for each of said determined time delays with a value equal to twice the square of the frequency of the components to which said determined time delay applies times the product of the powers of those components divided by the sum of said powers.

10. A method of measuring the time delay between first and second signals which are susceptible to noise corruption, said method comprising the steps of:
    providing said first and second signals; and
    comparing said first and second signals to determine the time delay of said second signal relative to said first signal by:
      dissecting said first signal into H frequency components and said second signal into H corresponding components at the same frequencies;
      determining from corresponding first signal and second signal components i, for each integer value of i, $i \leq i \leq H$, both a time delay $\Delta t_i$ of said second signal component i relative to said first signal component i and an associated weight ($W_i$) for that delay, said associated weight $W_i$ having a value which depends on the noise corruption of said components i; and
      combining said determined time delays $\Delta t_i$ and their associated weights $W_i$ to produce a weighted combination thereof as the value ($\overline{\Delta t}$) of the measurement of the time delay of said second signal relative to said first signal, whereby said value $\Delta t$ has a noise induced uncertainty which is less than it would be if said determined time delays $\Delta t_i$ were combined without weighting.

11. The method recited in claim 10 wherein said combining step comprises:
    multiplying each of said time delays $\Delta t_i$ by its associated weight $W_i$ to provide individual weighted time delays $W_i \Delta t_i$;
    adding said individual weighted time delays together;
    adding said individual weights $W_i$ together;
    dividing the sum of said weighted time delays by the sum of said weights; and
    providing the result of said division as the measured value ($\overline{\Delta t}$) of said time delay of said second signal relative to said first signal.

12. The method recited in claim 10 wherein said first and second signals are audio bandwidth signals derived respectively from first and second radio signals and said measured time delay is the difference in the time of arrival of said first and second radio signals.

13. The method recited in claim 10 wherein the time delay of said second signal relative to said first signal encodes transmitted data and said method further comprises:
    decoding said measured time delay value into a corresponding transmitted data value.

14. The method recited in claim 10 wherein said first and second signals are received respectively at first and second known, spaced apart locations and said method further comprises the step of:
    determining from said measured time delay value a set of possible locations of a common source of said first and second signals.

15. The method recited in claim 10 wherein said dissecting step comprises:
    sampling the amplitude of each of said signals at a rate commensurate with the bandwidth of said signals;
    converting the amplitudes of said samples to digital values; and
    Fourier transforming a set of 2H samples from said first signal and a time related set of said samples from said second signal to provide first signal transform data and second signal transform data, respectively, said transform data comprising said H frequency components.

16. The method recited in claim 15 wherein said first and second signals are audio bandwidth signals derived respectively from first and second radio signals and said measured time delay is the delay of said second radio signal relative to said first radio signal.

17. The method recited in claim 15 wherein said determining step comprises:
    for each frequency magnitude $|f_i|$ in said Fourier transform data calculating the phase ($\phi_{1i}$) and power ($S_{1i}$) of said first transform data and the phase ($\phi_{2i}$) and power ($S_{2i}$) of said second transform data; and
    for each frequency magnitude determining a time delay $$\Delta t_i = \frac{(\phi_{2i} - \phi_{1i})}{2\pi f_i},$$

where the difference ($\phi_{2i} - \phi_{1i}$) is taken modulo $2\pi$ and determining a weight $$W_i = \left(\frac{2S_{1i}S_{2i}}{S_{1i}+S_{2i}}\right)(f_i)^2.$$

18. The method recited in claim 17 further comprising:

determining a delay uncertainty $\sigma^2$ equal to $$\frac{1}{\left(\sum_{i=1}^{i=H-1} W_i\right)} \text{; and}$$

providing from a time sequence of J measurements of $\overline{\Delta t}$ ($\overline{\Delta t_j}, 1 \leq j \leq J$) a refined measurement $\hat{\Delta t}$ of the delay of said second signal relative to said first signal, said refined measurement $\hat{\Delta t}$ having a smaller uncertainty than any of said $\overline{\Delta t_j}$ on which it is based.

19. A method of measuring the time delay between first and second analog signals, said method comprising the steps of:

receiving said first and second analog signals; and
comparing said first analog signal to said second analog signal to determine said time delay between said first analog signal and said second analog signal by:

sampling the amplitude of each of said analog signals at a rate commensurate with the bandwidth of said analog signals;

converting the amplitudes of said samples to digital values;

Fourier transforming a set of 2H samples from said first signal and a time related set of said samples from said second signal to provide first signal transform data and second signal transform data, respectively;

extracting the first transform data phase ($\phi_{1i}$) and power ($S_{1i}$) and the second transform data phase ($\phi_{2i}$) and power ($S_{2i}$) for each frequency magnitude $|f_i|$ in said Fourier transform data;

for each frequency magnitude determining a time delay $$\Delta t_i = \frac{(\phi_{2i} - \phi_{1i})}{2\pi f_i}.$$

where the difference $(\phi_{2i} - \phi_{1i})$ is taken modulo $2\pi$ and determining a delay weight $$W_i = \left(\frac{2S_{1i}S_{2i}}{S_{1i}+S_{2i}}\right)(f_i)^2$$

and generating from said delays $\Delta t_i$ and said weights $W_i$ a measured value $\overline{\Delta t}$ of the time delay $$\overline{\Delta t} = \frac{\left(\sum_{i=1}^{i=H-1} (W_i)(t_i)\right)}{\left(\sum_{i=1}^{i=H-1}\right)}.$$

20. The method recited in claim 19 wherein said first and second analog signals are audio bandwidth signals derived respectively from first and second radio signals and said measured time delay is the time delay of said second radio signal relative to said first radio signal.

21. The method recited in claim 19 further comprising low pass filtering said received signals to remove components having frequencies above a threshold value prior to performing said sampling step.

* * * * *